(12) United States Patent
Wasilewski

(10) Patent No.: US 6,857,917 B1
(45) Date of Patent: Feb. 22, 2005

(54) METHOD FOR DEACTIVATING A MARINE ALTERNATOR DURING PERIODS OF HIGH ENGINE POWER REQUIREMENTS

(75) Inventor: Kurt J. Wasilewski, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/670,023

(22) Filed: Sep. 24, 2003

(51) Int. Cl.[7] ............................................. B63H 21/22
(52) U.S. Cl. .................................................... 440/1
(58) Field of Search ............................... 440/1; 322/11, 322/12

(56) References Cited

U.S. PATENT DOCUMENTS

| | | | | |
|---|---|---|---|---|
| 2,924,722 A | * | 2/1960 | McClure .................... 290/40 R |
| 3,602,005 A | * | 8/1971 | Kaye ........................... 62/230 |
| 3,619,632 A | * | 11/1971 | Labombarde ................ 290/43 |
| 4,111,174 A | | 9/1978 | Fitzner et al. ............... 123/148 |
| 4,268,787 A | * | 5/1981 | Sloan ............................. 322/8 |
| 4,318,699 A | * | 3/1982 | Wenstadt et al. .............. 440/1 |
| 4,325,350 A | | 4/1982 | Bauer et al. ................. 123/605 |
| 6,280,269 B1 | | 8/2001 | Gaynor ......................... 440/84 |
| 6,342,775 B1 | | 1/2002 | Sleder, Sr. .................. 320/116 |

FOREIGN PATENT DOCUMENTS

GB        2039172        *    7/1980

* cited by examiner

*Primary Examiner*—Sherman Basinger
(74) *Attorney, Agent, or Firm*—William D. Lanyi

(57) ABSTRACT

A method is provided for controlling the operation of the alternator in such a way that during certain conditions, such as rapid acceleration of a marine vessel in combination with a trimming maneuver, the alternator of the marine propulsion system is deactivated so that it does not provide a mechanical load on the engine during the accelerating maneuvers. This allows the engine to provide more power to the propeller and achieve the desired operating speed commanded by the operator of a marine vessel.

20 Claims, 2 Drawing Sheets

METHOD FOR DEACTIVATING A MARINE ALTERNATOR DURING PERIODS OF HIGH ENGINE POWER REQUIREMENTS

BACKGROUND OF THE INVENTION

1. Field of the Invention

The present invention is generally related to an operation of an alternator associated with the marine propulsion system and, more particularly, to a method for controlling the alternator in such a way that it does not decrease the power that can be provided by an internal combustion engine during certain modes of operation of a marine vessel.

2. Description of the Prior Art

Those skilled in the art of marine propulsion engines and electrical systems used with those engines are familiar with many types of alternators and associated circuits.

U.S. Pat. No. 4,111,174, which issued to Fitzner et al on Sep. 5, 1978, discloses an ignition system with an idle speed governor apparatus. An alternator driven capacitive discharge ignition system includes a tachometer circuit monitoring the speed-dependent repetition rate of discharge at an internal trigger power supply, the tachometer circuit causing the triggering threshold bias to be reduced below idle speed to electronically advance the timing. The ignition circuit includes a triggering threshold bias capacitor in series with the trigger pulse source and the trigger power supply having a pilot capacitor to alternately fire a pair of ignition silicon controlled rectifiers.

U.S. Pat. No. 6,342,775, which issued to Sleder, Sr. on Jan. 29, 2002, discloses an automatic battery switching circuit for a marine propulsion system. A battery switching circuit provides a mechanism by which a plurality of electrical storage batteries can be alternatively connected in parallel or series based on the position of a manually controlled joystick of a marine positioning and maneuvering system. When the joystick is in a neutral position in which no docking motion is demanded by the marine vessel operator, the storage batteries are connected in parallel so they can benefit by charging by an alternator or generator associated with an internal combustion engine. If the joystick is moved out of its neutral position, the batteries are immediately connected in series to provide power to a plurality of electric motors that are used to drive a plurality of impellers of the docking system.

U.S. Pat. No. 4,325,350, which issued to Bauer et al on Apr. 20, 1982, discloses an alternator-powered breakerless capacitor discharge ignition system having improved low-speed timing characteristics. An alternator-powered breakerless capacitor discharge ignition system for an alternate firing two-cylinder outboard motor provides improved timing characteristics at low, as well as high, engine speeds and prevents reverse engine rotation. The alternator rotor and stator assemblies define a first magnetic circuit which provides constant polarity, constant power pulses for charging a single capacitor in the system. The alternator rotor and trigger assemblies define a second magnetic circuit which provides synchronized narrow trigger pulses, successive ones of the trigger pulses being of opposite polarity, to operate an electronic control circuit to effect timed capacitor discharge to a pair of spark plug ignition coils in the system.

U.S. Pat. No. 6,280,269, which issued to Gaynor on Aug. 28, 2001, discloses an operator display panel control by throttle mechanism switch manipulation. A throttle control mechanism is provided with a plurality of buttons and a control unit that interprets the state of the various buttons and switches in different ways, depending on the state of a first operating parameter. The first operating parameter can be the gear selector position or the status of a manual selector switch or push button. Based on the state of the first operating parameter, at least one switch is interpreted to represent a first command based on a first state of the first operating parameter and a second command based on the second state of the first operating parameter. This allows dual functionality for the buttons and switches which reduces the required number of switches and also allows the important control switches to be placed easily within reach of the operator of a marine vessel.

The patents described above are hereby expressly incorporated by reference in the description of the present invention.

It is well known to use alternators in conjunction with an engine of a marine propulsion system in order to charge electrical storage batteries used as an electrical power source for the operation of the engine and associated equipment relating to the operation of the marine vessel. Under certain circumstances of operation, such as during a rapid acceleration from a standing position, maximum power is required from the engine in order to achieve the required acceleration rate necessary to rapidly accelerate the boat from a standing position to an on-plane operating condition. Since the alternator requires mechanical power provided by the engine, the engine is unable to provide as much of its total power to the function of propelling a marine vessel as could otherwise be possibly if the alternator loads were removed.

In a typical marine system, a belt driven alternator is provided to convert rotational mechanical energy, provided by the crankshaft of the engine, into electrical energy which is used to charge the batteries of the marine propulsion system. Unlike alternators normally used in automotive applications, marine alternators are small, compact, and generally incapable of supplying all of the energy necessary to accommodate large power, short duration, electrical loads such as the trimming operation used to change the attitude of a marine propulsion system relative to its marine vessel. As a result, many outboard motor manufacturers now specify a large ampere-hour battery which, when called upon, can safely and effectively supply the necessary energy to satisfy these types of conditions. Once the load, such as a trimming event, is removed from the system, the alternator can replenish the battery charge to its proper state in a reasonable amount of time without detracting from engine operating performance.

The sudden acceleration from a standing position of a marine vessel to an on-plane condition is a scenario that occurs frequently in certain marine vessel applications. The engine usually begins fully trimmed under, with the propeller moved forward to its closest position relative to the transom of the marine vessel, with the transmission in forward gear and the engine operating at idle speed immediately prior to the sudden acceleration. Upon initiation of a rapid acceleration event, the operator of the marine vessel commands maximum engine acceleration which corresponds to a wide open throttle (WOT) condition. As the engine is accelerating, the operator of the marine vessel is often trimming the engine upward to move the propeller rearwardly relative to the transom in order to achieve boat lift and to obtain maximum speed as quickly as possible. During this combination of acceleration and trimming, as much as 100 amperes of current can be required to run the trim pump under the rapidly accelerating marine vessel conditions. This often exceeds the capability of the small alternator's output and the battery's power is used to satisfy the balance of this electrical requirement.

Depending on the condition of the battery, it is often possible to rely solely on the battery to produce all electrical demands during this acceleration and trimming maneuver. However, the alternator continues to require mechanical power from the engine in known marine propulsion systems.

The power required to turn the alternator, when it is activated, could be advantageously used to enhance the acceleration time of the marine vessel if that power could alternatively by provided to the propeller.

In known marine propulsion systems, the alternator's field current is controlled by a voltage regulation circuit that is not sensitive to engine dynamic conditions. If an additional electrical load is applied to the system, the alternator will immediately react to this load and attempt to supply the electrical demand. This, in turn, provides an additional load on the engine which deprives the engine from the ability from providing maximum power to the propeller shaft in order to achieve the required acceleration in a minimum time.

It would therefore be significantly beneficial if a system could be provided by which the load on the engine caused by the alternator could be temporally removed during certain rapid acceleration and trimming maneuvers.

SUMMARY OF THE INVENTION

A method for controlling the alternator of a marine propulsion system, in accordance with the preferred embodiment of the present invention, comprises the steps of providing an engine as a source of motive power for said marine propulsion system and providing an electrical energy providing device connected in port transmitting relation with said engine. Throughout the description of the preferred embodiment of the present invention, it should be understood that the terms "electrical energy providing device" and "alternator" are used to mean any device that converts mechanical power, provided by the engine, into electrical power. This could be a conventional alternator which is well known to those skilled in the art or, alternatively, a different type of electrical generator that is capable of converting the engine's mechanical energy into electrical energy. A preferred embodiment of the present invention further comprises the step of monitoring and operating characteristic associated with the operating speed of the internal combustion engine. The operating characteristic is preferably the acceleration of the crankshaft during a predetermined period of time, but it should be understood that other operating characteristics can be used within the scope of the present invention. The present invention further comprises the step of comparing the operating characteristics to a preselected magnitude and deactivating the electrical energy providing device as a function of the relative magnitude of the operating characteristic and the preselected magnitude. In other words, if the acceleration of a crankshaft of the marine propulsion engine is monitored and determined to be greater than a preselected acceleration magnitude, indicating a rapid marine vessel accelerating event, the alternator is deactivated so that it no longer provides a significant mechanical load to the engine. When placed in a free wheeling mode, as opposed to an electrical energy producing mode, the alternator represents an insignificantly low mechanical load to the engine. As a result, maximum engine power can be directed to the propeller shaft.

As discussed above, the electrical energy providing device is typically an alternator in most marine propulsion systems, but it should be understood that alternative devices are also within the scope of the present invention. The alternator is connected in torque transmitting relation with the engine, in typical situations, by a belt and pulley arrangement, but it should be understood that this mechanical connection is not limiting to the scope of the present invention. Although the operating characteristic of the engine that is monitored is typically the rotational acceleration of a crankshaft, it should be understood that alternative characteristics can also be used.

In certain embodiments of the present invention, it further comprises the steps of providing an electrical battery and measuring a characteristic, such as voltage or strength of the battery and comparing the battery characteristic to a predetermined minimum threshold magnitude. The deactivating step of the present invention is then disabled if the battery characteristic is less than the predetermined minimum threshold magnitude. More specifically, the battery characteristic is usually a battery voltage that is monitored by an engine control module (ECM) or propulsion control module (PCM) of the propulsion system. If the battery voltage is less than a predetermined magnitude, such as 10.5 volts, the deactivating step of the present invention is disabled because it is deemed that the battery does not have sufficient power to perform the necessary tasks without the assistance of the alternator.

A preferred embodiment of the present invention can further comprise the step of providing a trim adjusting mechanism to change the relative position of the marine propulsion system in relation to the marine vessel and performing the deactivating step regardless of the relative magnitude of the operating characteristic and the preselected magnitude whenever the trim adjusting mechanism is activated and a signal to represent a timming operation. In other words, certain applications of the present invention can deactivate the alternator in every instance when the trim operation is commanded by the operator of the marine vessel. Although this is not preferred in every application of the present invention, it can achieve the similar goal even if the rate of acceleration of the engine is disregarded.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
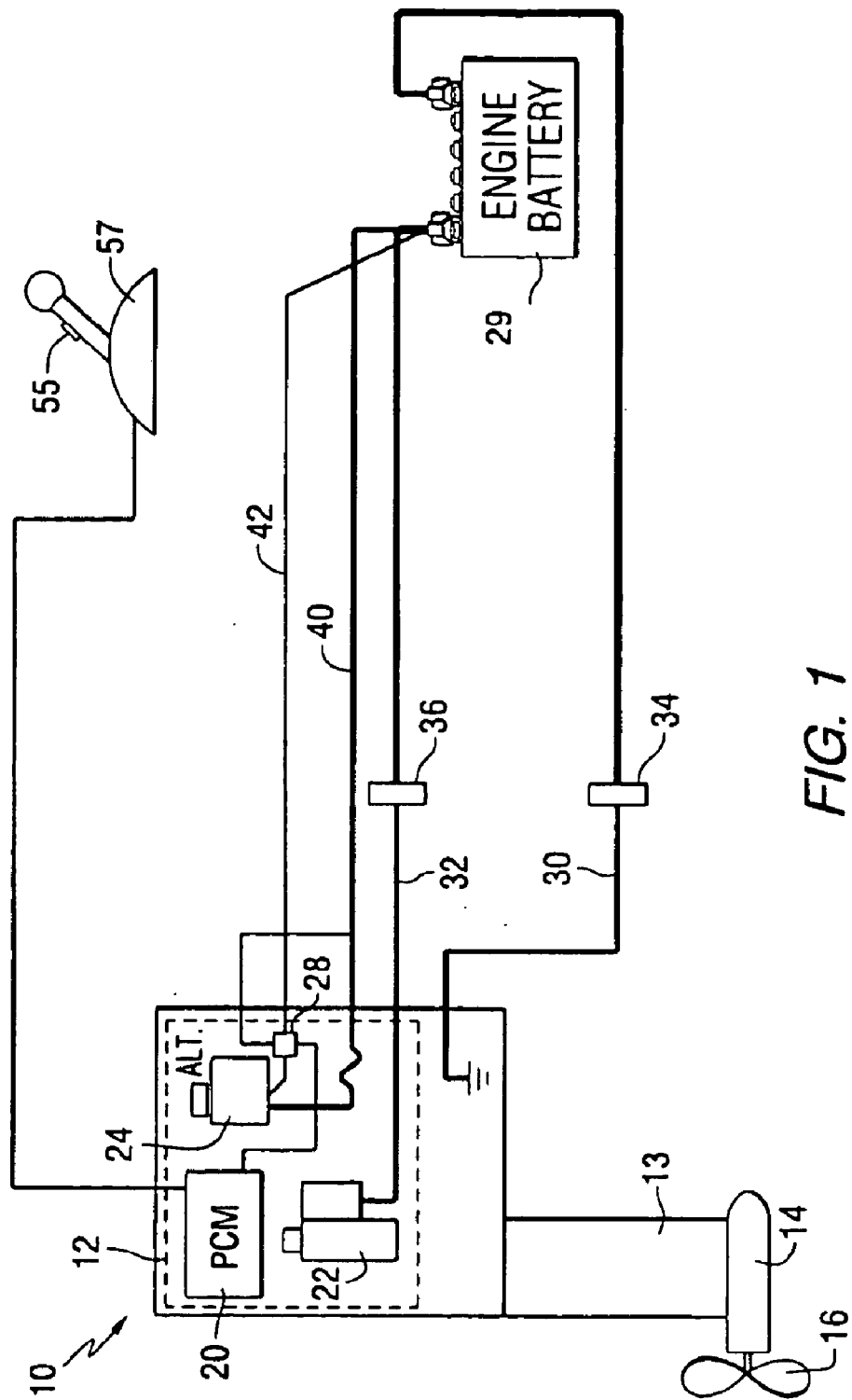
FIG. 1 is a simplified schematic illustration of an electrical system of a marine propulsion system.

Throughout the description of the preferred embodiment of the present invention, like components will be identified by like reference numerals.

FIG. 1 is a highly schematic representation of an outboard motor 10 which contains an engine 12, represented by dashed lines, a driveshaft housing 13, a gearcase 14 which houses a propeller shaft, and a propeller 16 which is attached to the propeller shaft for rotation relative to the gearcase 14. Also contained within the outboard motor 10 is a propulsion control module (PCM) 20, a starter motor 22, an alternator 24, and a control relay 28. It should be understood that the components of the outboard motor 10 are not all shown in their accurate positions relative to the engine 12, but the typical arrangement of the starter motor and alternator are well known to those skilled in the art. Generally, the alternator is driven by the crankshaft of the engine 12, either with a belt and pulley arrangement or a gear mesh relationship. Several connections are shown in FIG. 1. The ground connection for the battery 29 is identified by reference numeral 30. The connection through which the starter motor 22 receives power from the battery 29 is identified by reference numeral 32. Lines 30 and 32 both pass through appropriate terminal blocks, 34 and 36, respectively. The alternator 24 charges the battery 29 through line 40 in systems known to those skilled in the art, a sensing wire 42 connects the battery 29 directly to a regulator circuit of the alternator 24. This allows the alternator to be automatically activated and deactivated in response to the voltage magnitude of the battery 29 without requiring interaction by the propulsion control module 20. In other words, a sensing wire 42, in known systems, allows the regulator of the alternator to know the battery voltage so that it can determine when additional charging is required by the alternator. It should, however, be clearly understood, that known systems do not provide an additional control relay 28 as shown in FIG. 1. The control relay is provided in order to allow the method of the present invention to be performed. It allows the propulsion control module 20 to cause the relay 28 to be open so that no voltage signal is received by the regulation circuit of the alternator 24 on line 42. In most alternator regulator systems, the lack of a voltage signal from the battery 29 on line 42 will cause the regulator to deactivate as a safety precaution. This relationship is assumed in the following description.

Marine propulsion systems, such as that shown in FIG. 1, also are provided with a tachometer device (not shown in FIG. 1) or gear tooth sensor that allows the propulsion control module 20 to monitor the rotational speed and/or position of the crankshaft of the engine 12. This is well known to those skilled in the art and won't be further described herein.

Figure 2:
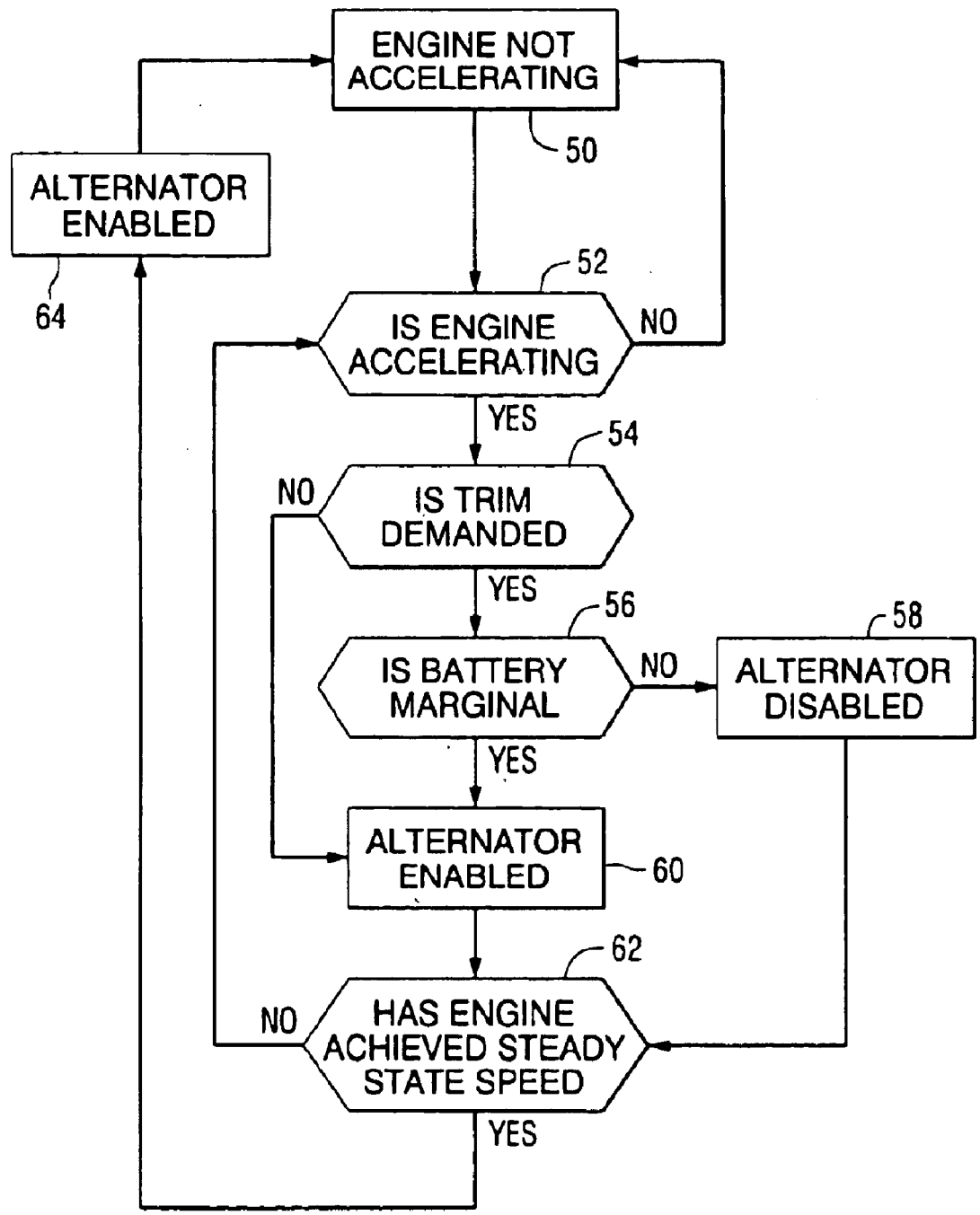
FIG. 2 is flow chart showing the basic steps of the present invention.

FIG. 2 is a flowchart that shows the basic step of the method of the present invention. With reference to FIGS. 1 and 2, beginning at functional block 50, it will initially be assumed that the engine 12 is not accelerating. At functional block 52, the tachometer or gear tooth sensor is monitored to determine the rotational speed of the crankshaft of the engine 12 at two successive times, which can be sequential rotations of the crankshaft. Alternatively, two measurements of rotational speeds can be taken and spaced apart by a longer preselected time delay. If the acceleration of the crankshaft exceeds a predetermined minimum threshold, the program proceeds to functional block 54. If no acceleration is occurring, it returns to functional block 50.

At functional block 54, a determination is made whether or not the operator of the marine vessel is demanding a trim operation as described above. Since the trim operation is commanded by a simple finger operated switch, such as by the switch 55 of a throttle mechanism 57 shown in FIG. 1, a signal can be easily provided from that switch 55 to the propulsion control module 20 that allows the question of functional block 54 to be answered. If a trim operation is demanded, as determined by functional block 54, while the engine is accelerating, as determined at functional block 52, the present invention proceeds to functional block 56 where it determines whether or not the voltage potential of the battery exceeds a predetermined minimum threshold, such as 10.5 volts. If it does not exceed that threshold, the battery is determined as being marginal and the present invention proceeds to functional block 60 to leave the alternator 24 enabled so that it can provide some additional electrical power to the battery and to other loads on the engine. If the battery is not in a marginal condition, the present invention proceeds to functional block 58 and the alternator is disabled by activating the control relay 28 which, in essence, opens line 42. This act essentially prevents the alternator regulation system from sensing the battery voltage. In other words, the sensed voltage will appear to be approximately 0 volts and the alternator will normally cease providing electrical power for safety reasons. This, in turn, causes it to freewheel in coordination with the crankshaft and not require a significant mechanical load that would otherwise deprive the engine 12 of power and prevent it from providing its maximum power to the propeller.

At functional block 62, a determination is made to see whether or not the engine 12 has achieved a steady state speed. In other words, functional block 62 determines whether or not the acceleration determined at functional block 52 has stopped. If it has stopped, the alternator is again enabled at functional block 64. However, if the engine remains in an accelerating mode, the present invention returns to functional block 52 to continue the interrogation described above.

By electrically eliminating the alternator's field current, the alternator is essentially placed in a freewheeling mode which, although rotating through a belt and pulley system with the crankshaft, does not place a significant mechanical load on the operation of the engine. This freewheeling state of the alternator allows the engine 12 to provide its maximum mechanical power to the propeller 16 rather than using some of that mechanical power to cause the alternator to rotate with its field current activated and provide electricity on line 40 to the battery 29.

It should be understood that many variations of the present invention can be used to achieve beneficial results. As an example, the alternator can be deactivated every time the marine propulsion system is in an accelerating mode as long as the battery has been determined to have sufficient power, as represented by functional block 56. In other words, even if the trim button 55 is not currently activated, the fact that the engine is in an accelerated mode can be used as the sole means for determining whether or not the alternator should be deactivated. Conversely, the trim button can be used as the sole measurement to deactivate the alternator, even if the engine is not currently in accelerating mode.

Although the present invention has been described in particular detail and illustrated to show a preferred embodiment, it should be understood that alternative embodiments are also within its scope. The basic function of the present invention is to unload the engine with respect to the mechanical load provided by an alternator that is generating electrical power. At certain times of operation, such as accelerating situations and/or trimming operations, it is beneficial to remove the alternator load from the engine so that the engine has more power to provide to the propeller of the marine propulsion system.

I claim:

1. A method for controlling the electrical system of a marine propulsion system, comprising the steps of:

providing an engine as a source of motive power for said marine propulsion system;

providing an electrical energy providing device connected in torque transmitting relation with said engine;

monitoring an operating characteristic associated with the operating speed of the internal combustion engine;

comparing said operating characteristic to a preselected magnitude;

deactivating the electrical energy providing device as a function of the relative magnitude of the monitored operating characteristic and the preselected magnitude;

providing a propulsion control unit which is connected in electrical communication with said electrical energy providing device;

providing an electrical battery;

measuring a characteristic of said battery;

comparing said battery characteristic to a predetermined minimum threshold magnitude; and disabling said deactivating step if said battery characteristic is less than said, predetermined minimum threshold magnitude.

2. The method of claim 1, wherein:

said electrical energy providing device is connected in torque transmitting relation with said engine by a belt and pulley arrangement.

3. The method of claim 1, wherein:

said electrical energy providing device is an alternator.

4. The method of claim 1, wherein:

said operating characteristic is an acceleration value associated with said engine.

5. The method of claim 4, wherein:

said acceleration value is the acceleration of the crankshaft of said engine measured over at least one complete revolution of said crankshaft.

6. The method of claim 5, wherein:

said acceleration value is the radial acceleration of the crankshaft of said engine measured over more than one complete revolution of said crankshaft.

7. The method of claim 1, further comprising:

providing a trimming mechanism by which the operator of said marine vessel is able to affect the horizontal attitude of said marine vessel; and providing a signal which is representative of the operating status of the trimming mechanism.

8. The method of claim 7, further comprising:

comparing said operating status of said trimming mechanism to a preselected operating status; and deactivating said electrical energy providing device as a function of the operating status of said trimming mechanism and said preselected operating status.

9. A method for controlling the electrical system of a marine propulsion system, comprising the steps of:

providing an engine as a source of motive power for said marine propulsion system;

providing an electrical energy providing device connected in torque transmitting relation with said engine;

providing a propulsion control unit which is connected in electrical communication with said electrical energy providing device;

monitoring an operating characteristic associated with the operating speed of the internal combustion engine;

comparing said operating characteristic to a preselected magnitude; and deactivating the electrical energy providing device as a function of the relative magnitude of the operating characteristic and the preselected magnitude, said operating characteristic being an acceleration value associated with said engine, said acceleration value being the acceleration of the crankshaft of said engine measured over at least one complete revolution of said crankshaft.

10. The method of claim 9, wherein:

said electrical energy providing device is connected in torque transmitting relation with said engine by a belt and pulley arrangement.

11. The method of claim 9, wherein:

said electrical energy providing device is an alternator.

12. The method of claim 9, further comprising:

providing an electrical battery;

measuring a characteristic of said battery;

comparing said battery characteristic to a predetermined minimum threshold magnitude; and disabling said deactivating step if said battery characteristic is less than said, predetermined minimum threshold magnitude.

13. A method for controlling the alternator of a marine propulsion system, comprising the steps of:

providing an engine as a source of motive power for said marine propulsion system;

providing an electrical energy providing device connected in torque transmitting relation with said engine;

monitoring an operating characteristic associated with the operating speed of the internal combustion engine;

providing a trimming mechanism by which the operator of said marine vessel is able to affect the horizontal attitude of said marine vessel;

providing a signal which represents the operating status of the trimming mechanism;

comparing said operating status of said trimming mechanism to a preselected operating status;

deactivating the electrical energy providing device as a function of the operating status of said trimming mechanism and said preselected operating status;

providing a propulsion control unit which is connected in electrical communication with said electrical energy providing device.

14. The method of claim 13, further comprising:

comparing said operating characteristic to a preselected magnitude; and deactivating said electrical energy providing device as a function of the operating characteristic and the preselected magnitude.

15. The method of claim 13, wherein:

said electrical energy providing device is connected in torque transmitting relation with said engine by a belt and pulley arrangement.

16. The method of claim 15, wherein:

said electrical energy providing device is an alternator.

17. The method of claim 16, wherein:

said operating characteristic is an acceleration value associated with said engine.

18. The method of claim 13, wherein:

said operating characteristic is an acceleration value of the crankshaft of said engine.

19. The method of claim 13, wherein:

said operating characteristic is the acceleration of the crankshaft of said engine measured over at least one complete revolution of said crankshaft.

20. The method of claim 13, further comprising:

providing an electrical battery;

measuring a characteristic of said battery;

comparing said battery characteristic to a predetermined minimum threshold magnitude; and disabling said deactivating step if said battery characteristic is less than said, predetermined minimum threshold magnitude.

\* \* \* \* \*